United States Patent
Mizowaki

(10) Patent No.: US 11,794,288 B2
(45) Date of Patent: Oct. 24, 2023

(54) ROSIN-MODIFIED PRODUCT, FLUX COMPOSITION, LIQUID FLUX, FLUX CORED SOLDER AND SOLDER PASTE

(71) Applicant: SENJU METAL INDUSTRY CO., LTD., Tokyo (JP)

(72) Inventor: Toshio Mizowaki, Tokyo (JP)

(73) Assignee: SENJU METAL INDUSTRY CO., LTD., Tokyo (JP)

(*) Notice: Subject to any disclaimer, the term of this patent is extended or adjusted under 35 U.S.C. 154(b) by 98 days.

(21) Appl. No.: 17/018,894

(22) Filed: Sep. 11, 2020

(65) Prior Publication Data

US 2021/0101232 A1 Apr. 8, 2021

(30) Foreign Application Priority Data

Oct. 3, 2019 (JP) ................................ 2019-182995

(51) Int. Cl.
 *B23K 35/362* (2006.01)
 *B23K 35/02* (2006.01)
 *C09F 1/04* (2006.01)

(52) U.S. Cl.
 CPC .......... *B23K 35/362* (2013.01); *B23K 35/025* (2013.01); *C09F 1/04* (2013.01)

(58) Field of Classification Search
 CPC ........ B23K 35/362; B23K 35/025; C09F 1/04
 See application file for complete search history.

(56) References Cited

U.S. PATENT DOCUMENTS

2014/0137988 A1* 5/2014 Minakuchi ......... B23K 35/3601
148/24

FOREIGN PATENT DOCUMENTS

| CN | 102513739 A | 6/2012 | |
|---|---|---|---|
| CN | 104858571 A | * 8/2015 | ......... B23K 35/3612 |
| CN | 104858571 A | 8/2015 | |
| CN | 104942481 A | * 9/2015 | |
| CN | 104942481 A | 9/2015 | |
| CN | 106514056 A | 3/2017 | |
| JP | 5445716 B2 | 3/2014 | |

OTHER PUBLICATIONS

Extended European Search Report for EP app. No. 20197630.5, dated Nov. 18, 2020.

* cited by examiner

*Primary Examiner* — Scott R Kastler
(74) *Attorney, Agent, or Firm* — Ladas & Parry, LLP

(57) ABSTRACT

A rosin-modified product
 being a reactant of a rosin or a rosin derivative and an alkanolamine represented by a following Formula (1)

$$NH_{3-n}-(R-OH)_n (n \leq 3); \text{ or} \qquad (1)$$

being produced by a reaction of a rosin or a rosin derivative, an organic acid and an alkanolamine.

8 Claims, No Drawings

ROSIN-MODIFIED PRODUCT, FLUX COMPOSITION, LIQUID FLUX, FLUX CORED SOLDER AND SOLDER PASTE

BACKGROUND

Technical Field

The present invention relates to a rosin-modified product, a flux composition, a liquid flux, a flux cored solder, and a solder paste.

The present application claims the priority of Japanese Patent Application No. 2019-182995 filed on Oct. 3, 2019, the contents of which are entirely incorporated by reference.

Related Art

Electrodes are formed to fit terminals such as leads of electronic components on a board such as a printed circuit board on which the electronic components are mounted. Fixation and electrical connection between the electronic components and the board are performed mainly by soldering. On such a board, ion migration (hereinafter, referred to as "migration") may occur due to causes such as attachment of a water droplet between the electrodes to which direct voltage is applied at soldered parts of the terminals of the electronic components and the electrodes of the board.

The migration refers to a phenomenon in which metal ions dissolved from a positive electrode receive electrons at a negative electrode between the electrodes to which direct voltage is applied and reduced metal grows from the negative electrode, so that the reduced metal extends up to the positive electrode to short-circuit both electrodes. Thus, when the migration occurs, both electrodes are short-circuited so that functions as the board are lost.

In general, a flux used for soldering has such an efficacy that it chemically removes a metal oxide existing on a surface of a solder and a surface of the metal to be soldered at a temperature at which the solder melts and can move a metal element through a boundary therebetween, and by using the flux, it is possible to form an intermetallic compound between the surface of the solder and the surface of the metal to be soldered so that strong bonding is obtainable.

The flux includes components that are not decomposed or evaporated by heating of the soldering and the components remain as a flux residue around a soldered part after the soldering. As one of causes of the aforementioned migration, attachment of a water droplet between the electrodes is mentioned. Since rosin included in the flux as a main component has water repellency, the migration does not directly occur because of the water repellent effect of the rosin even if a water droplet is attached on the flux residue as long as the flux residue including rosin as a main component is formed on the soldered part.

However, if cracks occur in the flux residue, moisture permeates from the cracked part of the flux residue into the flux residue so that this moisture causes the migration to occur.

In this regard, a measure against the migration occurring due to a water droplet or the like has hitherto been taken by configuring the structure of the board as a structure preventing a water droplet from being attached to a surface to be soldered. Alternatively, it has been also taken by performing a moisture-proofing coating on the surface to be soldered.

On the other hand, in a technology of suppressing an occurrence of migration by the flux residue, a technology of adding phosphoric acid ester into the flux has been proposed (see JP 5445716 B2).

SUMMARY

The hydrophobic film of phosphoric acid ester adsorbed to the soldered part suppresses the attachment of a water droplet or the like to the soldered part on which the flux residue is formed, and even in a case where cracks occur in the flux residue when the soldered part is exposed to inferior circumstances, it is possible to suppress the attachment of a water droplet or the like to the soldered part and to suppress the occurrence of migration due to the attachment of a water droplet or the like.

However, even in the flux disclosed in JP 5445716 B2, in a case where the flux residue is small, when a water droplet or the like is attached to the soldered part on which the film of phosphoric acid ester is formed to be thin, it is difficult to suppress the occurrence of migration.

The present invention has been made to solve such problems, and an object thereof is to provide a rosin-modified product and the like that do not only allow the flux residue to cover the soldered part but also suppress the occurrence of migration, in the soldered part on which the flux residue is formed.

[Concept 1]

A rosin-modified product may be a reactant of a rosin or a rosin derivative and an alkanolamine represented by a following Formula (1).

$$NH_{3-n}-(R-OH)_n (n \leq 3) \tag{1}$$

[Concept 2]

A rosin-modified product may be produced by a reaction of a rosin or a rosin derivative, an organic acid and an alkanolamine.

[Concept 3]

A flux composition may comprise the rosin-modified product according to Concept 1 or 2.

[Concept 4]

The flux composition according to Concept 3 may further comprise a reactant of two molecules of alkanolamine.

[Concept 5]

In the flux composition according to Concept 3 or 4, a mixing amount of the rosin-modified product may be 5% by weight to 65% by weight based on a total amount of a flux.

[Concept 6]

The flux composition according to any one of Concepts 3 to 5 may further comprise a phosphoric acid ester or a phosphonic acid ester, wherein a mixing amount of the phosphoric acid ester or the phosphonic acid ester may be 1.0% by weight to 15% by weight based on a total amount of a flux.

[Concept 7]

The flux according to any one of Concepts 3 to 6 may further comprise an organic acid, wherein a mixing amount of the organic acid may be more than 0% by weight and 10% or less by weight based on a total amount of a flux.

[Concept 8]

A liquid flux may comprise:

the flux composition according to any one of Concepts 3 to 7; and a solvent.

[Concept 9]

A flux cored solder in which the flux composition according to any one of Concepts 3 to 7 may be filled.

[Concept 10]

A solder paste may comprise:
the flux composition according to any one of Concepts 3 to 7;
a thixotropic agent;
a solvent; and
solder powders.

[Concept 11]

A liquid flux may have an amount of current, which is measured by using 289Si manufactured by Fluke Corporation under conditions of 25° C. and humidity 50% after following process, being 100 μA or less,
wherein the process includes
50 μl of a flux is applied to a board being a comb type electrode board type 2 (FR-4),
then the flux is dried at 100° C. for 10 minutes,
then 10 μl of ion-exchange water is added dropwise on the flux, and
then a voltage (applied voltage: DC 5 V) is applied to the board for 3 minutes.

[Concept 12]

In the liquid flux according to Concept 11,
the amount of current may be 10 μA or less.

The rosin-modified product and the flux composition using the rosin-modified product of the present invention can suppress the occurrence of migration due to the attachment of a water droplet or the like.

DETAILED DESCRIPTION

A liquid flux of the present embodiment may be configured by dissolving a flux composition using a rosin-modified product of the embodiment described below in a solvent. A flux cored solder of the present embodiment may be configured by sealing a flux composed of a flux composition using a rosin-modified product of the present embodiment described below in a wire solder. A solder paste of the present embodiment may be configured by adding a thixotropic agent, a solvent, and solder powder to a flux composition using a rosin-modified product of the embodiment described below.

1. Rosin-Modified Product

The rosin-modified product of the present embodiment may be produced by reaction of a rosin or a rosin derivative, an organic acid, and alkanolamine. The rosin-modified product produced in this way may be composed of a reactant of a rosin or a rosin derivative and alkanolamine represented by the following Structural Formula (1). The number of carbon atoms in R may be 1 to 5.

  Formula (1)

$NH_{3-n}$—(R—OH)$_n$ (n≤3)

When a flux or the like is produced, a reactant of two molecules of alkanolamine may be included in addition to the reactant with such alkanolamine. As an example of such a reactant of two molecules of alkanolamine, a reactant of two molecules of diethanolamine can be mentioned.

As an example of the reactant of a rosin or a rosin derivative and alkanolamine, reactants represented by the following structural formulas can be mentioned. Incidentally, the following Structural Formulas (2) and (3) are an aspect of using diethanolamine as alkanolamine, and in the case of using another alkanolamine, a part corresponding to diethanolamine is replaced by the alkanolamine.

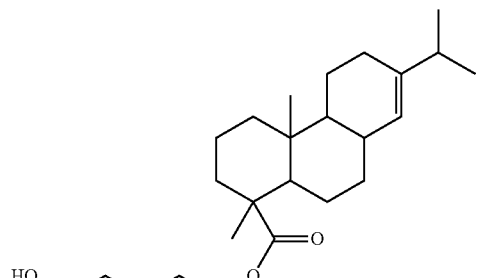

Formula (2)

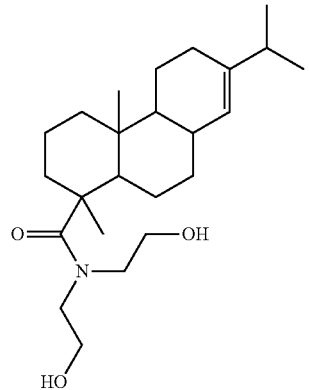

Formula (3)

The reactant of a rosin or a rosin derivative and alkanolamine may include the composition of Structural Formula (2), the composition of Structural Formula (3), or both the composition of Structural Formula (2) and the composition of Structural Formula (3) (as described above, the above-described Structural Formulas (2) and (3) are an aspect of using diethanolamine as alkanolamine, but in the case of using another alkanolamine, a part corresponding to diethanolamine is replaced by the alkanolamine).

The contents of the rosin or the rosin derivative, the organic acid, and the alkanolamine, which are used when producing the rosin-modified product, may be 40% by weight to 80% by weight of the rosin or the rosin derivative, 1% by weight to 15% by weight of the organic acid, and 1% by weight to 30% by weight of the alkanolamine.

It could be confirmed that, in a case where the content of the rosin or the rosin derivative that is used when producing the rosin-modified product is less than 40% by weight, the rosin-modified product is sticky. On the other hand, it could be confirmed that, in a case where the content of the rosin or the rosin derivative that is used when producing the rosin-modified product is more than 80% by weight, the migration suppression effect is weak.

It could be confirmed that, in a case where the content of the organic acid that is used when producing the rosin-modified product is more than 15% by weight, an unreacted organic acid is precipitated to become an unstable rosin-modified product.

It could be confirmed that, in a case where the content of the alkanolamine that is used when producing the rosin-modified product is more than 30% by weight, the insulation resistance value is decreased by unreacted alkanolamine.

Examples of the rosin include raw material rosins such as gum rosin, wood rosin, and tall oil rosin, and derivatives obtained from the raw material rosins. Examples of the rosin derivative include purified rosin, hydrogenated rosin, disproportionated rosin, polymerized rosin, acid-modified rosin, phenol-modified rosin, and α,β unsaturated carboxylic acid-modified products (such as acrylated rosin, maleated rosin, and fumarated rosin), purified products, hydrides, and disproportionated products of the polymerized rosin, purified products, hydrides, and disproportionated products of the α,β unsaturated carboxylic acid-modified products, and the like, and one or two or more kinds of these can be used. The acid value of the rosin or the rosin derivative is 15 mgKOH/g or more, which is advantageous. The rosin may include dehydroabietic acid, dihydroabietic acid, tetrahydroabietic acid, and the like.

Examples of the organic acid include succinic acid, glutaric acid, adipic acid, pimelic acid, suberic acid, sebacic acid, azelaic acid, dimer acid, propionic acid, 2,2-bishydroxymethyl propionic acid, tartaric acid, malic acid, glycolic acid, diglycolic acid, thioglycolic acid, dithioglycolic acid, stearic acid, 12-hydroxystearic acid, palmitic acid, oleic acid, and the like.

Examples of the alkanolamine include ethanolamine, 3-amino-1-propanol, 1-amino-2-propanol, diethanolamine, diisopropanolamine, triethanolamine, triisopropanolamine, and the like.

2. Flux Composition

The flux composition of the present embodiment is prepared, for example, by mixing a rosin-modified product, an organic acid, amine, and an organic halogen compound.

The mixing amount of the rosin-modified product is preferably 5% by weight to 65% by weight based on the total amount of the flux. In the case of using the rosin-modified product in combination with phosphoric acid ester and/or phosphonic acid ester, a preferred total mixing amount of the phosphoric acid ester and/or the phosphonic acid ester is 1% by weight to 15% by weight based on the total amount of the flux.

Examples of the organic acid include succinic acid, glutaric acid, adipic acid, pimelic acid, suberic acid, sebacic acid, azelaic acid, dimer acid, propionic acid, 2,2-bishydroxymethyl propionic acid, tartaric acid, malic acid, glycolic acid, diglycolic acid, thioglycolic acid, dithioglycolic acid, stearic acid, 12-hydroxystearic acid, palmitic acid, oleic acid, and the like. The mixing amount of the organic acid is preferably 0% by weight to 10% by weight based on the total amount of the flux for soldering.

Examples of the amine include ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3', 5'-di-tert-amylphenyl)benzotriazole, 2-(2'-hydroxy-5'-tert-octylphenyl)benzotriazole, 2,2'-methylenebis[6-(2H-benzotriazole-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl] benzotriazole, carboxybenzotriazole, 1-[N,N-bis(2-ethylhexyl)aminomethyl]methylbenzotriazole, 2,2'-[[(methyl-1H-benzotriazole-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazole-1-yl)methyl]-4-methylphenol, 5-methylbenzotriazole, 5-phenyltetrazole, and the like. The mixing amount of the amine is preferably 0% by weight to 10% by weight based on the total amount of the flux for soldering.

Examples of the organic halogen compound include 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, and the like. The mixing amount of the organic halogen compound is preferably 0% by weight to 5% by weight based on the total amount of the flux for soldering.

A solvent can be mixed in the flux composition of the present embodiment in order to dissolve a solid substance. Examples of the solvent include water, an alcohol-based solvent, a glycol ether-based solvent, terpineols, and the like. Examples of the alcohol-based solvent include isopropyl alcohol, 1,2-butanediol, Isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis (methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexanedimethanol, erythritol, threitol, guaiacol glycerol ether, 3,6-dimethyl-4-octyne-3,6-diol, 2,4,7,9-tetramethyl-5-decyne-4,7-diol, and the like. Examples of the glycol ether-based solvent include hexyl diglycol, diethylene glycol mono-2-ethylhexyl ether, ethylene glycol monophenyl ether, 2-methylpentane-2,4-diol, diethylene glycol monohexyl ether, diethylene glycol dibutyl ether, triethylene glycol monobutyl ether, and the like. The mixing amount of the solvent is preferably 10% by weight to 90% by weight based on the total amount of the flux for soldering.

An antioxidant can be mixed in the flux composition of the present embodiment in order to suppress the oxidation of solder alloy powder. As the antioxidant, a hindered phenol-based antioxidant such as 2,2'-methylenebis[6-(1-methylcyclohexyl)-p-cresol] can be used. The mixing amount of the antioxidant is preferably 0% by weight to 5% by weight based on the total amount of the flux for soldering.

A thixotropic agent can be mixed in the flux composition of the present embodiment in order to adjust the solder paste to have a viscosity suitable for printing. Examples of the thixotropic agent include a wax-based thixotropic agent and an amide-based thixotropic agent. As the wax-based thixotropic agent, for example, hydrogenated castor oil and the like are mentioned. Examples of the amide-based thixotropic agent include lauric amide, palmitic amide, stearic amide, behenic amide, hydroxystearic amide, saturated fatty acid amide, oleic amide, erucamide, unsaturated fatty acid amide, p-toluenemethanamide, aromatic amide, methylenebis stearic amide, ethylenebis lauric amide, ethylenebis hydroxystearic amide, saturated fatty acid bisamide, methylenebis oleic amide, unsaturated fatty acid bisamide, m-xylylenebis stearic amide, aromatic bisamide, saturated fatty acid polyamide, unsaturated fatty acid polyamide, aromatic polyamide, substituted amide, methylol stearic amide, methylol amide, fatty acid ester amide, and the like. The mixing amount of the thixotropic agent is preferably 3% by weight to 15% by weight based on the total amount of the flux for soldering.

An additive such as halogen, a matting agent, or a defoamer may be further added to the flux composition of the present embodiment. The mixing amount of the additive is preferably 10% by weight or less and more preferably 5% by weight or less based on the total amount of the flux for soldering.

Examples

Hereinafter, the present invention will be described in detail by means of Examples and Comparative Examples. Incidentally, the present invention is not limited to these Examples.

Preparation of Rosin-Modified Product

To a 200-ml beaker, KE-604 (acid-modified rosin: manufactured by ARAKAWA CHEMICAL INDUSTRIES, LTD.) or KE-604 and KR-610 (disproportionated rosin: manufactured by ARAKAWA CHEMICAL INDUSTRIES, LTD.) at % by weight shown in the following Table 1, adipic acid, sebacic acid, or phenylsuccinic acid, and diethanolamine, monoisopropanolamine, or monoethanolamine were added and heated to 200° C. over about 15 minutes under stirring. Next, after the resultant mixture was held at 200° C. for 15 minutes, the resultant mixture was returned to room temperature, thereby obtaining rosin-modified products 1 to 6. The structural formula of the obtained rosin-modified product was specified using GC/MS analysis and LC/FTMS (orbitrap), and thus it could be determined that the rosin-modified product was composed of a reactant of a rosin or a rosin derivative and alkanolamine represented by the following Structural Formula (1).

$$NH_{3-n}-(R-OH)_n (n \leq 3) \qquad \text{Formula (1)}$$

Incidentally, the presence of an organic acid cannot be confirmed in the above-described reactant of a rosin or a rosin derivative and alkanolamine. However, the effect of suppressing the occurrence of migration cannot be sufficiently exhibited in a case where an organic acid is not used when producing the reactant. Further, the organic acid can be confirmed to be decreased when producing the reactant of a rosin or a rosin derivative and alkanolamine. Thus, adding an organic acid when producing the above-described reactant of a rosin or a rosin derivative and alkanolamine is advantageous.

When the structural formula of the rosin-modified product is specified, it could also be determined that a reactant of two molecules of alkanolamine is included in addition to the above-described reactant of a rosin or a rosin derivative and alkanolamine. Therefore, in the aspect in which the reactant of two molecules of alkanolamine is included in addition to the reactant of a rosin or a rosin derivative and alkanolamine, a flux composition or the like which will be described below may be produced.

TABLE 1

|  | Rosin-modified product 1 | Rosin-modified product 2 | Rosin-modified product 3 | Rosin-modified product 4 | Rosin-modified product 5 | Rosin-modified product 6 |
|---|---|---|---|---|---|---|
| KE604 | 70 | 92 | 55 | 70 | 70 | 25 |
| KR610 |  |  |  |  |  | 45 |
| Adipic acid | 10 | 3 | 15 |  |  | 10 |
| Sebacic acid |  |  |  | 10 |  |  |
| Phenylsuccinic acid |  |  |  |  | 10 |  |
| Diethanolamine | 20 | 5 | 30 |  |  | 20 |
| Monoisopropanolamine |  |  |  | 20 |  |  |
| Monoethanolamine |  |  |  |  | 20 |  |
| Total | 100 | 100 | 100 | 100 | 100 | 100 |

Preparation of Flux

Respective components were kneaded at compositions and formulations shown in Tables 2 to 5, and thereby each liquid flux was prepared. Examples 1 to 18 are shown in Tables 2 to 4. Comparative Examples 1 to 4 are shown in Table 5. Incidentally, in Tables 2 to 5, the unit of numerical values representing compositions is % by weight unless otherwise specified. The unit of the insulation resistance is n, and the unit of the amount of current at during a water-drop test is µA.

TABLE 2

|  | Example 1 | Example 2 | Example 3 | Example 4 | Example 5 | Example 6 | Example 7 |
|---|---|---|---|---|---|---|---|
| Rosin-modified product 1 | 10 | 35 | 60 | 10 |  |  |  |
| Rosin-modified product 2 |  |  |  |  |  |  |  |
| Rosin-modified product 3 |  |  |  |  |  |  |  |
| Rosin-modified product 4 |  |  |  |  | 10 |  |  |
| Rosin-modified product 5 |  |  |  |  |  | 10 |  |
| Rosin-modified product 6 |  |  |  |  |  |  | 15 |

TABLE 2-continued

|  | Example 1 | Example 2 | Example 3 | Example 4 | Example 5 | Example 6 | Example 7 |
|---|---|---|---|---|---|---|---|
| Sebacic acid |  |  |  | 1 | 1 | 1 | 1 |
| Adipic acid |  |  |  |  |  |  |  |
| Diethanolamine |  |  |  |  |  |  |  |
| KE-604 |  |  |  |  | 5 | 5 |  |
| KE-311 |  |  |  |  | 5 |  |  |
| Phosphonic acid ester |  |  |  |  |  |  |  |
| IPA | 90 | 65 | 40 | 89 | 79 | 84 | 84 |
| Total | 100 | 100 | 100 | 100 | 100 | 100 | 100 |
| Insulation resistance | 3.50E+13 | 9.00E+12 | 3.50E+12 | 2.50E+12 | 2.00E+13 | 3.00E+13 | 4.00E+13 |
| Amount of current during water-drop test | 87 | 0 | 0 | 15 | 11 | 30 | 42 |
| Migration | Δ | ○ | ○ | Δ | Δ | Δ | Δ |

TABLE 3

|  | Example 8 | Example 9 | Example 10 | Example 11 | Example 12 | Example 13 | Example 14 |
|---|---|---|---|---|---|---|---|
| Rosin-modified product 1 |  |  |  |  |  |  |  |
| Rosin-modified product 2 |  |  |  |  |  |  | 10 |
| Rosin-modified product 3 |  |  |  |  |  | 10 |  |
| Rosin-modified product 4 |  |  |  |  |  |  |  |
| Rosin-modified product 5 |  |  |  |  |  |  |  |
| Rosin-modified product 6 | 15 | 15 | 15 | 15 | 15 |  |  |
| Sebacic acid | 1 | 1 | 1 | 2 | 1 | 1 | 1 |
| Adipic acid |  |  |  |  |  |  |  |
| Diethanolamine |  |  |  |  |  |  | 1 |
| KE-604 | 5 |  |  |  | 5 |  | 5 |
| KE-311 |  | 5 | 5 | 5 |  | 10 | 5 |
| Phosphonic acid ester |  |  | 2 | 2 | 4 | 2 | 2 |
| IPA | 79 | 79 | 77 | 76 | 75 | 77 | 76 |
| Total | 100 | 100 | 100 | 100 | 100 | 100 | 100 |
| Insulation resistance | 5.00E+13 | 3.00E+13 | 2.00E+12 | 1.00E+12 | 2.00E+10 | 3.00E+11 | 5.00E+09 |
| Amount of current during water-drop test | 50 | 78 | 0 | 0 | 2 | 1 | 3 |
| Migration | Δ | Δ | ○ | ○ | ○ | ○ | ○ |

TABLE 4

|  | Example 15 | Example 16 | Example 17 | Example 18 |
|---|---|---|---|---|
| Rosin-modified product 1 | 5 | 65 |  |  |
| Rosin-modified product 2 |  |  |  |  |
| Rosin-modified product 3 |  |  |  |  |
| Rosin-modified product 4 |  |  |  |  |
| Rosin-modified product 5 |  |  |  |  |
| Rosin-modified product 6 |  |  | 15 | 15 |
| Sebacic acid |  |  | 1 | 1 |
| Adipic acid |  |  |  |  |
| Diethanolamine |  |  |  |  |
| KE-604 |  |  |  |  |
| KE-311 |  |  | 5 | 5 |
| Phosphonic acid ester |  |  | 0.5 | 11 |
| IPA | 95 | 35 | 78.5 | 68 |
| Total | 100 | 100 | 100 | 100 |

TABLE 4-continued

|  | Example 15 | Example 16 | Example 17 | Example 18 |
|---|---|---|---|---|
| Insulation resistance | 3.00E+12 | 1.00E+12 | 3.00E+13 | 7.00E+08 |
| Amount of current during water-drop test | 94 | 0 | 30 | 3 |
| Migration | Δ | ○ | Δ | ○ |

TABLE 5

|  | Comparative Example 1 | Comparative Example 2 | Comparative Example 3 | Comparative Example 4 |
|---|---|---|---|---|
| Rosin-modified product 1 |  |  |  |  |
| Rosin-modified product 2 |  |  |  |  |
| Rosin-modified product 3 |  |  |  |  |
| Rosin-modified product 4 |  |  |  |  |
| Rosin-modified product 5 |  |  |  |  |
| Rosin-modified product 6 |  |  |  |  |
| Sebacic acid | 1 | 1 |  |  |
| Adipic acid | 1 | 1 | 3 |  |
| Diethanolamine | 1 | 1 |  |  |
| KE-604 | 15 | 15 | 15 |  |
| KE-311 |  |  |  | 35 |
| Phosphonic acid ester |  | 2 |  |  |
| IPA | 82 | 80 | 82 | 65 |
| Total | 100 | 100 | 100 | 100 |
| Insulation resistance | 5.00E+08 | 3.00E+08 | 3.00E+13 | 2.00E+13 |
| Amount or current during water-drop test | 351 | 351 | 351 | 351 |
| Migration | X | X | X | X |

<Current Value Measurement and Water-Drop Test>

50 μl of each flux was applied to a board being a comb type electrode board type 2 (FR-4) and then dried at 100° C. for 10 minutes. Thereafter, 10 μl of ion-exchange water was added dropwise on the flux. A voltage (applied voltage: DC 5 V) was applied to the board for 3 minutes and the current value was measured using 289Si manufactured by Fluke Corporation under conditions of 25° C. and humidity 50%. Furthermore, a voltage (applied voltage: DC 5 V) was applied to the board for 10 minutes, and then, whether or not migration occurs was observed with a microscope.

(Water-Drop Determination Criteria)

○: The migration does not occur from the negative electrode.

Δ: The migration occurs from the negative electrode, but does not reach the positive electrode.

x: The migration occurs from the negative electrode and reaches the positive electrode.

<Insulation Resistance Value Measurement>

50 μl of each flux was applied to a board being a comb type electrode board type 2 (FR-4) and dried at 100° C. for 10 minutes, and then the insulation resistance value was measured under conditions of 25° C. and humidity 50%. As an apparatus, 4329A manufactured by HP Development Company, L.P. was used.

From the above-described experimental result, it could be confirmed that, in a case where the current value during the water-drop test is low, migration can be suppressed. It could be confirmed that, particularly in the liquid flux in which the amount of current during the water-drop test is 10 μA or less, migration does not occur.

In general, it has been considered that, in a case where the insulation resistance value is low, migration is likely to occur, but from the above-described experimental result, it could be confirmed that, even when the insulation resistance value is low, migration is difficult to occur in some cases. On the other hand, it could be confirmed that, in the flux composition in which the amount of current during the water-drop test is 100 μA or less, migration is less likely to occur. It could be confirmed that, particularly in the flux composition in which the amount of current during the water-drop test is 10 μA or less, migration does not occur.

It could be confirmed that, in a case where an organic acid is further added to the rosin-modified product produced from rosin or a rosin derivative, an organic acid, and alkanolamine (see Examples 4 to 14), the current value in the water-drop test can be lowered, and the occurrence of migration can be more reliably suppressed. From the viewpoint of the effect of lowering the current value in the water-drop test, it could be confirmed that sebacic acid is used as an organic acid to be added, which is particularly advantageous.

It could be confirmed that, in a case where phosphonic acid ester is further added to the rosin-modified product produced from rosin or a rosin derivative, an organic acid, and alkanolamine (see Examples 10 to 14), the current value in the water-drop test can be lowered to 10 μA or less, and the occurrence of migration can be further more reliably suppressed. It could also be confirmed that the amount of the phosphonic acid ester added exceeds 0.5% by weight and is 1.0% by weight or more based on the whole flux, which is advantageous (see Example 17).

It could be confirmed that, in a case where the content of the rosin-modified product produced from rosin or a rosin derivative, an organic acid, and alkanolamine is increased to 35% by weight or more based on the whole flux (see Examples 2, 3, and 16), the current value in the water-drop test can be lowered, and the occurrence of migration can be more reliably suppressed. On the other hand, it could be confirmed that, even when the content of the rosin-modified product is small and 15% by weight or less based on the whole flux and the insulation resistance value is in a range of $7 \times 10^1$ to $2 \times 10^{12}$, migration does not occur in the flux composition in a case where the amount of current during the water-drop test is 10 µA or less.

Incidentally, KE-311 (rosin ester: manufactured by ARAKAWA CHEMICAL INDUSTRIES, LTD.) is considered to be composed of an ester of hydrogenated rosin and glycerin represented by the following Structural Formulas (4) to (7). It could be confirmed that, in the case of using KE-311 alone, the current value in the water-drop test becomes higher, and the occurrence of migration cannot be suppressed (Comparative Example 4).

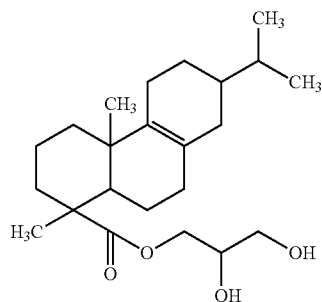

Formula (4)

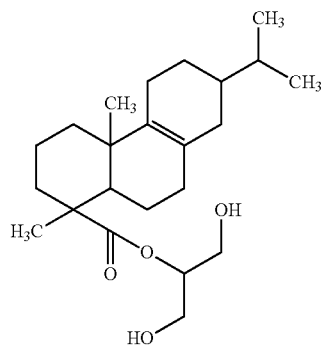

Formula (5)

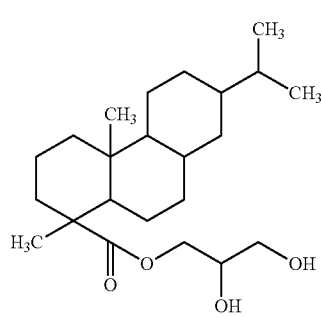

Formula (6)

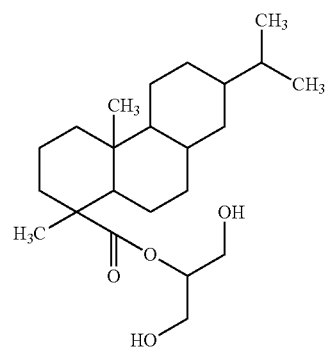

Formula (7)

As shown above, the flux composition obtained by mixing rosin or a rosin derivative, an organic acid, and alkanolamine caused migration to occur by the water-drop test, and the insulation resistance value was also lowered.

The flux composition using the rosin-modified product of the present invention suppressed migration caused by the water-drop test and the insulation resistance value was not lowered.

The rosin-modified product and the flux composition using the rosin-modified product of the present invention could suppress the occurrence of migration due to the attachment of a water droplet or the like.

The present embodiment can provide a flux composition comprising a rosin-modified product being a reactant of rosin or a rosin derivative and an alkanolamine represented by a following Formula (1), wherein the rosin-modified product has an amide bond obtained by condensing a COOH group of a rosin or a rosin derivative and an $NH_{3-n}$ group in the following Formula (1), or an ester bond obtained by condensing a COOH group of a rosin or a rosin derivative and an OH group in the following Formula (1).

$$NH_{3-n}\text{---}(R\text{---}OH)_n (n \leq 3) \quad (1)$$

The present embodiment can provide a method for manufacturing a flux composition by using a rosin-modified product, which is obtained by mixing and heating a rosin or a rosin derivative, an organic acid and an alkanolamine having a following Formula (1).

$$NH_{3-n}\text{---}(R\text{---}OH)_n (n \leq 3) \quad (1)$$

What is claimed is:

1. A flux composition comprising:
   a rosin-modified product being a reaction product of a rosin or a rosin derivative and an alkanolamine represented by a following Formula (1)

$$NH_{3-n}\text{---}(R\text{---}OH)_n (n \leq 3); \quad (1)$$

a phosphoric acid ester or a phosphonic acid ester; and
   a sebacic acid,
   wherein a mixing amount of the phosphoric acid ester or the phosphonic acid ester is 1.0% by weight to 15% by weight based on a total amount of the flux composition,
   wherein a mixing amount of the sebacic acid is more than 0% by weight and 2% or less by weight based on a total amount of the flux; and
   wherein the flux composition has an effect to suppress an occurrence of migration.

2. The flux composition according to claim 1 further comprising a reaction product of two alkanolamines.

3. The flux composition according to claim 1, wherein a mixing amount of the rosin-modified product is 5% by weight to 65% by weight based on a total amount of the flux composition.

4. A liquid flux comprising:
   the flux composition according to claim 1; and
   a solvent.

5. A flux cored solder in which the flux composition according to claim 1 is filled.

6. A solder paste comprising:
   the flux composition according to claim 1;
   a thixotropic agent;
   a solvent; and
   solder powders.

7. The flux composition of claim 1, wherein the rosin-modified product is produced by a reaction of the rosin or the rosin derivative, the alkanolamine and an organic acid , wherein the organic acid comprises succinic acid, glutaric acid, adipic acid, pimelic acid, suberic acid, sebacic acid, azelaic acid, dimer acid, propionic acid, 2,2-bishydroxymethyl propionic acid, tartaric acid, malic acid, glycolic acid, diglycolic acid, thioglycolic acid, dithioglycolic acid, stearic acid, 12-hydroxystearic acid, palmitic acid, or oleic acid.

8. The flux composition of claim 7, wherein contents of rosin or the rosin derivative, the organic acid, and the alkanolamine for the reaction are 40% to 80% by weight, 1% to 15% by weight, and 1% to 30% by weight, respectively.

* * * * *